Jan. 4, 1944. J. G. ZUBER 2,338,680

MOTION PICTURE MECHANISM

Filed Aug. 2, 1940

INVENTOR
JOHN G. ZUBER
BY Robert L. Michel
ATTY.

Patented Jan. 4, 1944

2,338,680

UNITED STATES PATENT OFFICE 2,338,680

MOTION PICTURE MECHANISM

John G. Zuber, Chicago, Ill., assignor to The Bell & Howell Company, Chicago, Ill., a corporation of Illinois Application August 2, 1940, Serial No. 349,565

3 Claims. (Cl. 88—18.4)

My invention relates particularly to the intermittent feed and light shutter mechanism of sound motion picture projecting machines, and more particularly to intermittent feed and light shutter mechanism of the skip feed motion and high light interruption frequency type such as is disclosed in U. S. Patent No. 1,680,295, granted August 14, 1928, on application of A. S. Howell, for Motion picture apparatus.

The general object of the invention resides in the provision of a novel and effective intermittent feed and exposure shutter mechanism of the above type which permits of a comparatively low frequency feed cycle of the intermittent feed mechanism for the instant purpose of reducing the noise thereof and the tendency of such noise to interfere with sound reproduction and which permits of the retention of a desirably high light interruption frequency.

With this object in view, my invention consists in certain features of novelty in the construction, combination, and arrangement of parts by which said object and certain other objects, hereinafter appearing, are effected all as fully described with reference to the accompanying drawing, and more particularly pointed out in the appended claims.

In the said drawing—

Figure 1:
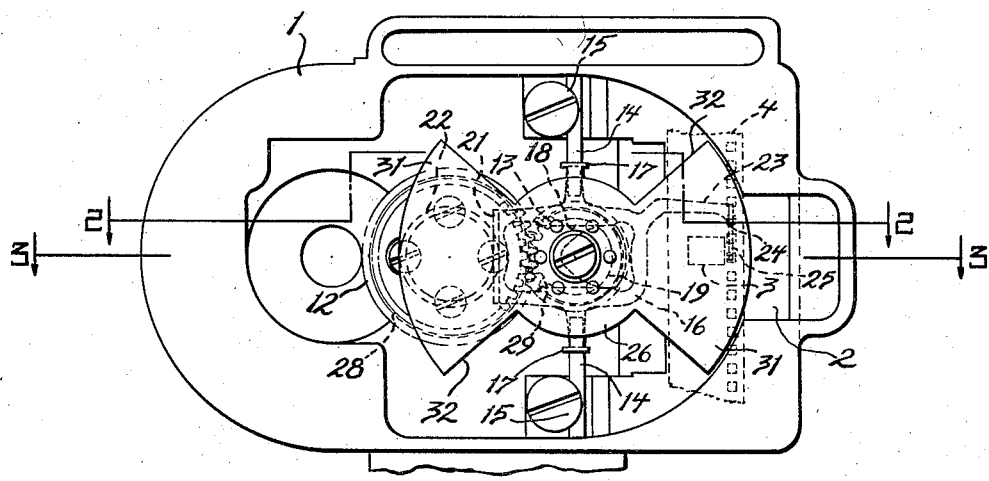
Figure 1 is a rear elevation of an intermittent feed and exposure shutter mechanism embodying my invention.

Referring to the drawing, I designates an enclosing frame forming a part of a motion picture projector frame, and a transversely disposed vertically extending film face guide plate 2 is secured on the frame and is provided with a light aperture 3 through which light from a suitable source passes for projection from a portion of a usual vertically disposed feed perforated film strip 4 retained against the guide plate for vertical movement by usual guide means not shown. See Figures 1 and 2.

A shaft 5 is rotatably mounted on the frame I on a horizontal axis to one side of and normal to the plane of the guide plate 2 by means of a suitable bearing partially shown at 6, and a second shaft 7 is rotatably mounted on the frame I on a horizontal axis parallel to that of the shaft 5 and at the side thereof remote from the plate 2 by means of a suitable bearing partially shown at 8.

A bushing 9 is secured on a projecting end of the shaft 7, and an axially bored member 11 is secured on the bushing 9 for rotation with this shaft. A large spur gear 12 on the member 11 meshes with a small spur gear 13 on the shaft 5 whereby a plurality of revolutions of the shaft 5 is effected during one revolution of the shaft 7, the bushing 9 and the member 11, the ratio shown being two revolutions of the shaft 5 to one revolution of the shaft 7.

A pair of studs 14 are secured on the frame I, as designated at 15, and are disposed in alined spaced relation on a vertical axis intersecting the axis of the shaft 5. A shuttle plate 16 is disposed in a vertical plane and the upper and lower portions thereof are provided with laterally disposed coaxial bored bearing portions 17 which are engaged on the studs 14 for pivotal movement of the shuttle plate on the stud axis and movement therealong. See Figures 1 and 2.

The shuttle plate is provided with a central aperture 18 elongated transversely of its pivotal axis and forming opposed surfaces extending transversely of the pivotal axis of the plate in intermediate relation with the studs 14. A radial cam 19 is formed on the shaft 5 and is engaged in the aperture 18 and operates on said opposed surfaces to effect reciprocating film feeding and return movement of the shuttle along the studs 14 during rotation of the shaft 5. The shuttle plate has a vertically extending cam engaging portion 21 extending in parallelism with the pivotal axis thereof, and an axial cam 22 formed on the member 11 engages the portion 21 and operates thereon to effect oscillating film engaging and disengaging movement of the shuttle plate on its pivotal axis. The shuttle plate is provided with an arm 23 extending laterally in the plane thereof, and the outer end of this arm is provided with a tooth 24 adapted to extend through a vertical slot 25 in the guide plate 2 and engage usual feed perforations of the film 4 for feeding the same.

As the cams 19 and 22 are rotated in timed relation by reason of the meshing connecting gears 12 and 13, the cam 19 effects one reciprocating film feed and return movement of the shuttle plate with each revolution thereof and the cam 22 effects one oscillating film engaging and return movement of the shuttle plate with each revolution thereof and is adapted in its timed relation with the cam 19 to effect film engaging and disengaging movement of the shuttle plate in film feeding relation with but one of each plurality of feeding movements of the shuttle plate. As shown, the film is advanced during but one of each two revolutions of the cam 19 by reason of the two-to-one gears 12 and 13 connecting the cams 19 and 22.

Figure 2:
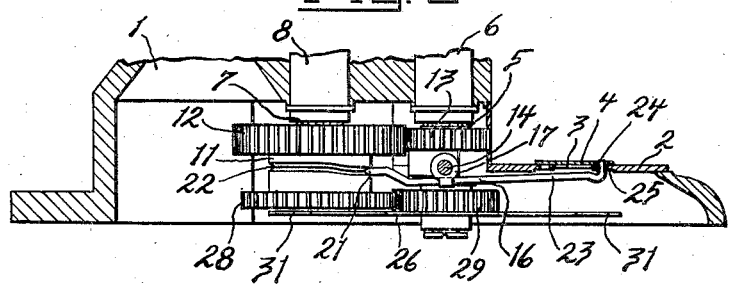
Figure 2 is a sectional view substantially on the line 2—2 of Figure 1.
Figure 3:
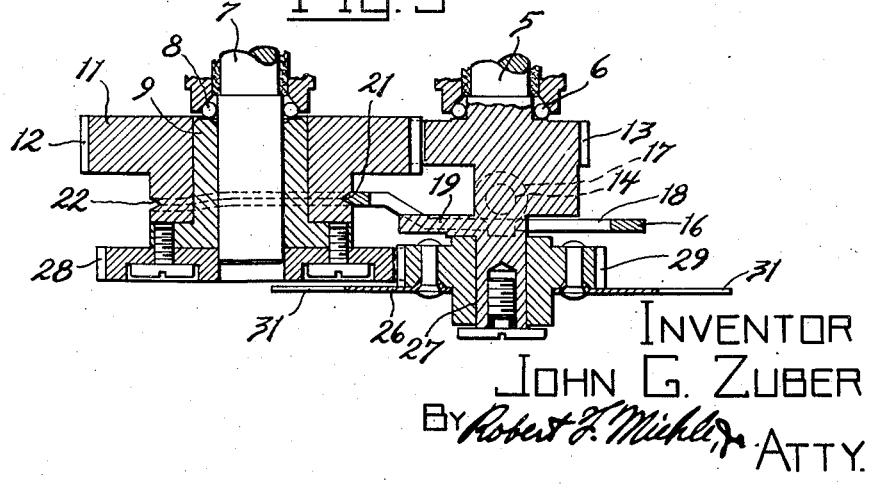
Figure 3 is an enlarged partial sectional view substantially on the line 3—3 of Figure 1.

A light interrupting disk shutter 26 is rotatably mounted, as designated at 27 in Figure 2, on the shaft 5 and consequently in coaxial relation with the cam 19. A large spur gear 28 is secured on the bushing 9 and meshes with a small spur gear 29 fixed with the shutter 26 whereby the shutter is rotated in timed relation with the cams 19 and 22 of the intermittent feed mechanism, above described, and at a greater revolution frequency than that of the cam 22, the ratio shown being one and one-half revolutions of the shutter to one revolution of the cam 22. By reason of the two-to-one gears 13 and 12 connecting the cams 19 and 22 and the one and one-half-to-one gears 29 and 28 connecting the cam 22 and the shutter, the shutter has a revolution frequency of one and one-half-to-two revolutions of the feed cam 19.

The shutter is provided with diametrically opposite spaced shutter blades 31 providing diametrically opposite light openings 32 therebetween, the blades 31 sweeping over the light aperture 3 in operative relation with the feed film 4. Accordingly, the shutter has a light interrupting frequency greater than the feed cycle frequency of the feed cam 19, as shown, the ratio being a shutter light interruption frequency of three to a feed cam cycle frequency of two, thus attaining the object heretofore set forth.

While I have thus described my invention, I do not wish to be limited to the precise details described, as changes may be readily made without departing from the spirit of my invention, but having thus described my invention, I claim as new and desire to secure by Letters Patent the following:

1. In a motion picture mechanism, the combination with an intermittent strip feed mechanism comprising a revoluble feed member and means operative to effect feed of a strip by said feed member during but one of each two revolutions thereof, of a revoluble light interrupting shutter in operative relation with a strip fed by said feeding mechanism and adapted to interrupt light in diametrically opposite positions thereof, and rotatory means for rotating said shutter in timed relation with said feed mechanism at a revolution frequency of one and one-half to two revolutions of said feed member.

2. In a motion picture mechanism, the combination with an intermittent strip feed mechanism comprising a revoluble feed member, a second revoluble member for rendering said feed member operative and inoperative to effect feed of a strip, and two-to-one gearing connecting said revoluble members to effect feed of the strip during but one of each two revolutions of said feed member, of a revoluble light interrupting shutter in operative relation with a strip fed by said feed mechanism and adapted to interrupt light in diametrically opposite positions thereof, and additional gearing for rotating said shutter in timed relation with said feed mechanism at a revolution frequency of one and one-half to one revolution of said second revoluble member.

3. In a motion picture mechanism, the combination with an intermittent strip feed mechanism comprising a revoluble shaft provided with a radial feed cam, a revoluble axial cam disposed in parallelism with said shaft for rendering said feed cam operative and inoperative to effect feed of a strip, and two-to-one spur gearing connecting said shaft and axial cam to effect feed of the strip during but one of each two revolutions of said shaft, of a light interrupting disk shutter in operative relation with a strip fed by said feed mechanism and rotatably mounted on said shaft and provided with two diametrically opposite spaced shutter blades, and one and one-half-to-one spur gearing connecting said axial cam and said shutter for rotating said shutter in timed relation with said feed mechanism at a revolution frequency of one and one-half to one revolution of said axial cam.

JOHN G. ZUBER.